US011998098B2

(12) United States Patent
Richards et al.

(10) Patent No.: US 11,998,098 B2
(45) Date of Patent: Jun. 4, 2024

(54) HAIR DRYER ATTACHMENT

(71) Applicant: SharkNinja Operating LLC, Needham, MA (US)

(72) Inventors: Joshua Thomas Richards, Hassocks (GB); Thomas Edward Kingsborough Cody, London (GB); Steven Luke Bailey, Greater London (GB); Shannon Marie McSweeney, South Boston, MA (US); Daniel John Innes, Boston, MA (US)

(73) Assignee: SharkNinja Operating LLC, Needham, MA (US)

(*) Notice: Subject to any disclaimer, the term of this patent is extended or adjusted under 35 U.S.C. 154(b) by 753 days.

(21) Appl. No.: 17/139,548

(22) Filed: Dec. 31, 2020

(65) Prior Publication Data

US 2022/0202157 A1 Jun. 30, 2022

(51) Int. Cl.

| | |
|---|---|
| ***A45D 20/12*** | (2006.01) |
| ***A46B 9/02*** | (2006.01) |
| ***A46B 15/00*** | (2006.01) |
| ***F26B 3/06*** | (2006.01) |

(52) U.S. Cl.

CPC ............ *A45D 20/124* (2013.01); *A46B 9/023* (2013.01); *A46B 9/028* (2013.01); *A46B 15/0055* (2013.01); *F26B 3/06* (2013.01); *A46B 2200/104* (2013.01)

(58) Field of Classification Search

CPC ...... A45D 20/124; A46B 9/023; A46B 9/028; A46B 15/055; A46B 2200/104; F26B 3/06

USPC ...................................................... 34/95–100

See application file for complete search history.

(56) References Cited

U.S. PATENT DOCUMENTS

| | | | | |
|---|---|---|---|---|
| 2,781,763 | A | 2/1957 | Casey et al. | |
| 5,060,398 | A | 10/1991 | Wolens | |
| 5,275,339 | A * | 1/1994 | Andis | A45D 20/122 239/443 |
| 5,488,783 | A | 2/1996 | Parkinson et al. | |

(Continued)

FOREIGN PATENT DOCUMENTS

| | | | |
|---|---|---|---|
| AU | 2013285200 | A1 | 1/2015 |
| CN | 202635949 | U | 1/2013 |

(Continued)

OTHER PUBLICATIONS

International Search Report and Written Opinion received for PCT Application No. PCT/US2021/064493, dated Jul. 12, 2022, 10 pages.

(Continued)

*Primary Examiner* — Stephen M Gravini

(74) *Attorney, Agent, or Firm* — Mintz, Levin, Cohn, Ferris, Glovsky and Popeo, P.C.

(57) ABSTRACT

An attachment for a hair dryer that is movable between a first position and a second position in order to alter one or more characteristics of the airflow therethrough. In one embodiment, an attachment having multiple facets and types of projections with varying stiffness are provided on an outer housing that can be rotated relative to a base by the user. In a second embodiment, an attachment having a concave surface with prongs extending therethrough that can be moved such that the exposed portion of the prongs are lengthened or shortened, as desired.

13 Claims, 6 Drawing Sheets

(56) References Cited

U.S. PATENT DOCUMENTS

| | | | | |
|---|---|---|---|---|
| 5,715,847 | A * | 2/1998 | Rolf | A45D 20/122 132/129 |
| 5,953,829 | A | 9/1999 | Van Den Brug et al. | |
| 9,936,788 | B2 * | 4/2018 | Stephens | A45D 20/122 |
| 9,936,789 | B2 | 4/2018 | Stephens et al. | |
| 10,575,617 | B2 | 3/2020 | Courtney et al. | |
| 11,185,142 | B1 | 11/2021 | Potter et al. | |
| 11,589,662 | B2 * | 2/2023 | Kim | A46B 9/023 |
| 2013/0174439 | A1 * | 7/2013 | Ragosta | A45D 20/124 239/548 |
| 2016/0367003 | A1 | 12/2016 | Stephens et al. | |
| 2016/0367006 | A1 * | 12/2016 | Stephens | A45D 20/122 |
| 2016/0367008 | A1 | 12/2016 | Stephens et al. | |
| 2017/0006991 | A1 | 1/2017 | Stephens et al. | |
| 2017/0079401 | A1 | 3/2017 | Courtney et al. | |
| 2017/0273425 | A1 | 9/2017 | Stephens et al. | |
| 2019/0098979 | A1 | 4/2019 | Atkinson et al. | |
| 2019/0216199 | A1 | 7/2019 | Shelton et al. | |
| 2021/0315353 | A1 * | 10/2021 | Kim | A45D 20/122 |
| 2022/0202156 | A1 | 6/2022 | Richards | |
| 2022/0202157 | A1 * | 6/2022 | Richards | A45D 20/12 |
| 2022/0202158 | A1 | 6/2022 | Potter et al. | |
| 2023/0172335 | A1 * | 6/2023 | Richards | A46B 9/028 34/97 |

FOREIGN PATENT DOCUMENTS

| | | | |
|---|---|---|---|
| DE | 102012220756 | B4 | 2/2017 |
| EP | 1779745 | B1 | 5/2008 |
| EP | 2713806 | B1 | 3/2015 |
| EP | 3310207 | A1 | 4/2018 |
| EP | 3461364 | A1 | 4/2019 |
| GB | 2261602 | A | 5/1993 |
| GB | 2424831 | A | 10/2006 |
| GB | 2515809 | B | 8/2015 |
| GB | 2515811 | B | 11/2015 |
| GB | 2531431 | A | 4/2016 |
| GB | 2539431 | A | 12/2016 |
| GB | 2539438 | A | 12/2016 |
| GB | 2539440 | A | 12/2016 |
| GB | 2539441 | A | 12/2016 |
| GB | 2548617 | A | 9/2017 |
| GB | 2566976 | A | 4/2019 |
| GB | 2566977 | A | 4/2019 |
| GB | 2576017 | A | 2/2020 |
| KR | 200463385 | Y1 | 11/2012 |
| KR | 101223709 | B1 | 1/2013 |
| KR | 20150017572 | A | 2/2015 |
| WO | 2016203197 | A1 | 12/2016 |
| WO | 2019239090 | A1 | 12/2019 |
| WO | 2020165554 | A1 | 8/2020 |

OTHER PUBLICATIONS

U.S. Appl. No. 18/102,618, filed Jan. 27, 2023, Hair Dryer Attachment.

* cited by examiner

HAIR DRYER ATTACHMENT

FIELD OF THE INVENTION

The present invention relates to hair dryers in general and attachments for hair dryers in particular.

BACKGROUND

Hair dryers are well known in the art to provide a flow of air that a user can utilize to dry wet hair. In many instances, the hair dryer also heats and/or ionizes the air prior to the air exiting the hair dryer. Hair dryers generally include an outlet that includes an opening with fixed dimensions where the heated air is expelled from the device. It is known in the art that altering one or more aspects of the airflow (e.g., speed, direction, type of flow, etc) at the device outlet can be accomplished by providing a removable hair dryer attachment thereon.

The disclosed embodiments of the present invention improve on the shortcomings of the prior art hair dryer attachments that are currently known.

SUMMARY

According to one aspect of a first embodiment of the present invention, an attachment for a hair dryer includes an outer frame and a base. The outer frame includes a first facet, a second facet, and at least one frame engagement feature. The base is rotatably coupled to the outer frame and includes an attachment inlet and at least one base engagement feature. The outer frame and base, together, form an internal volume through which airflow can pass between the attachment inlet to the attachment outlet. The first facet includes a first set of prongs and at least one opening operable to permit airflow to exit the attachment. At times the at least one base engagement feature is engaged with the frame engagement feature, the base is prevented from rotating relative to the outer frame. At times the at least one base engagement feature is not engaged with the frame engagement feature, the base is rotatable to a user selected position relative to the outer frame.

According to one aspect of a second embodiment of the present invention, an attachment for a hair dryer includes an outer housing, a base and a first prong. The outer housing has a concave surface that includes an opening. The base is coupled to the outer housing such that the base and the outer housing define an internal volume therebetween. The base also defines an attachment inlet operable to receive airflow from a hair dryer. The first prong is coupled to a movable platform and extends from the platform to a distal end. The prong includes a prong air passageway operable to permit air to pass through the prong. The platform is positioned in the internal volume and at least a portion of the prong extends through the opening in the concave surface. The movable platform is movable between a first position and a second position, wherein a greater portion of the prong extends through the opening at times the platform is in the second position than at times the platform is in the first position.

One advantage of the present invention is that the user may select the length of the prong that extends from the concave surface based on factors such as volume of the hair to be dried, the length of the hair to be dried, or degree of curl in the user's hair.

Another advantage of the present invention is that the user may deliver hot, dry air from a hair dryer into the wet head of hair via the distal ends of the prong(s).

These and other advantages will be apparent to one of skill in the art in light of the figures and detailed description provided herein.

DETAILED DESCRIPTION OF THE INVENTION

Figure 1:
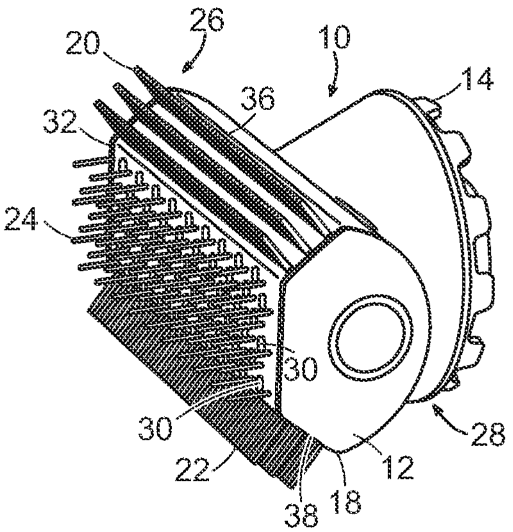
FIG. 1 is an isometric view of a first embodiment of the hair dryer attachment of the present invention.

Referring to FIG. 1, a first embodiment of the hair dryer attachment 10 is shown. The hair dryer attachment 10 includes an outer frame 12, a base 14, an attachment inlet 16, and attachment outlet 18, a first set of bristles 20, a second set of bristles 22, and a set of prongs 24.

Figure 2:
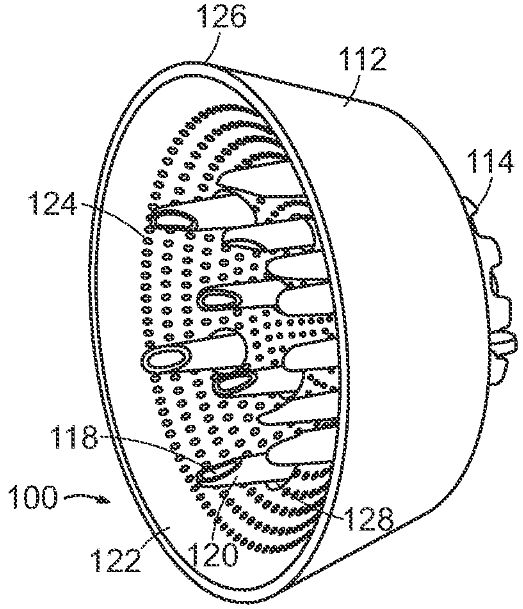
FIG. 2 is an isometric view of a second embodiment of the hair dryer attachment of the present invention.

Referring to FIG. 2, a second embodiment of the hair dryer attachment 100 is shown. The hair dryer attachment 100 includes an outer housing 112, a base 114, an attachment inlet 116, attachment outlet 118, and a series of prongs 120.

Figure 3A:
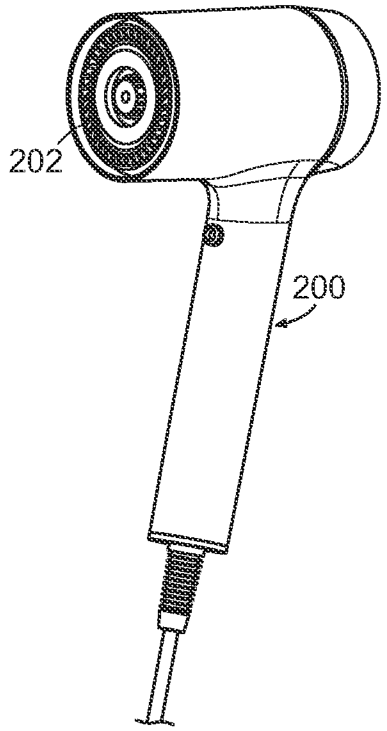
FIG. 3A is an isometric view of a typical hair dryer.
Figure 3B:
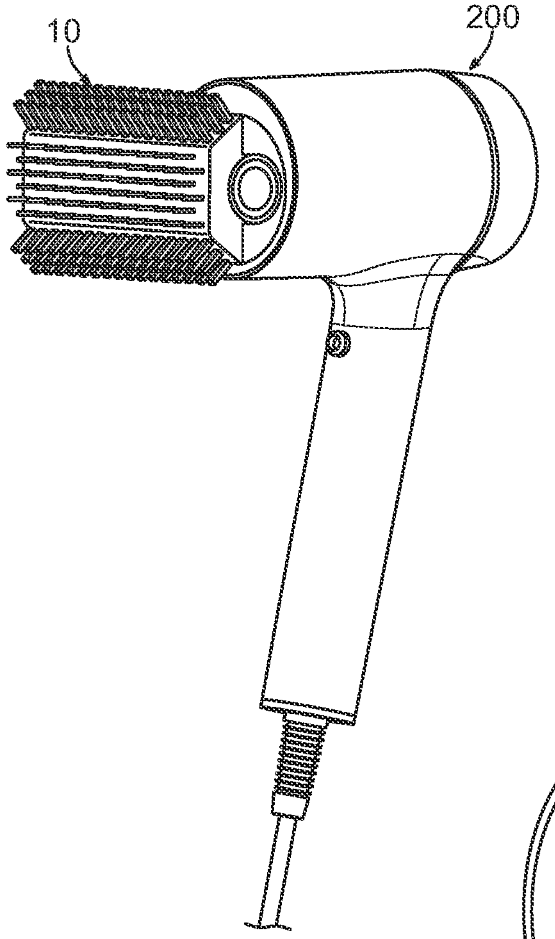
FIG. 3B is an isometric view of a typical hair dryer with the hair dryer attachment of FIG. 1 replaceably coupled thereto.
Figure 3C:
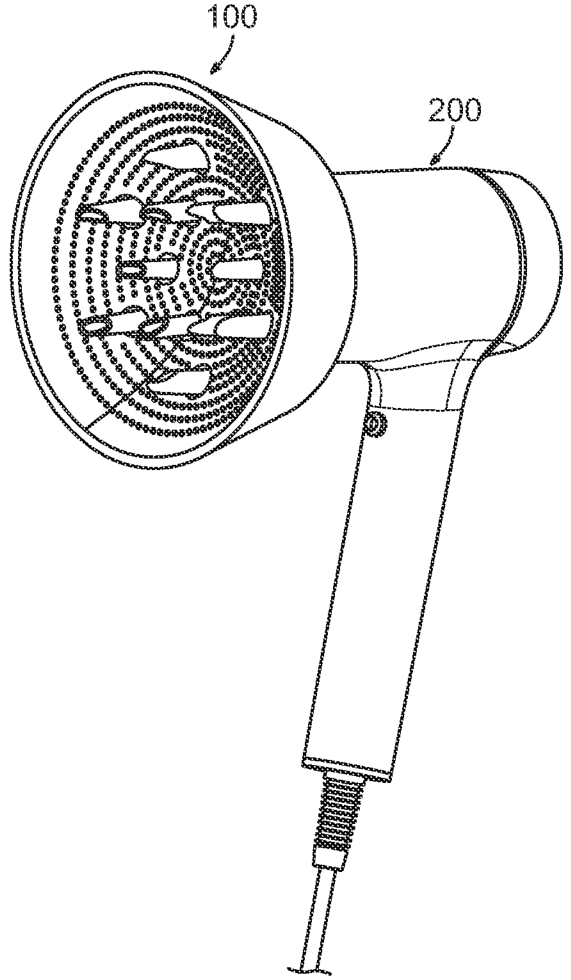
FIG. 3C is an isometric view of a typical hair dryer with the hair dryer attachment of FIG. 2 replaceably coupled thereto.

Referring now to FIGS. 3A, 3B and 3C, both embodiments of the hair dryer attachments 10, 100 are removably attachable to the hair dryer 200 shown in FIG. 3. The attachment between the hair dryer 200 and the hair dryer attachment 10, 100 can be achieved, in both embodiments, by any acceptable means. For instance, the hair dryer attachments 10, 100 can be press fit onto the hair dryer 200, the hair dryer attachments 10, 100 and hair dryer 200 can include complementary connectors, and/or the hair dryer attachments 10, 100 can be attached using a magnetic connection. In some embodiments, once attached, the hair dryer attachment 10, 100 can rotate relative to the hair dryer 200 while attached; however, in other preferred embodiments, the hair dryer attachment 10, 100 is not rotatable relative to the hair dryer 200 once attached. When attached, the attachment inlet 16, 116 of the hair dryer attachment 10, 100 is in fluid communication with the hair dryer outlet 202.

Figure 4A:
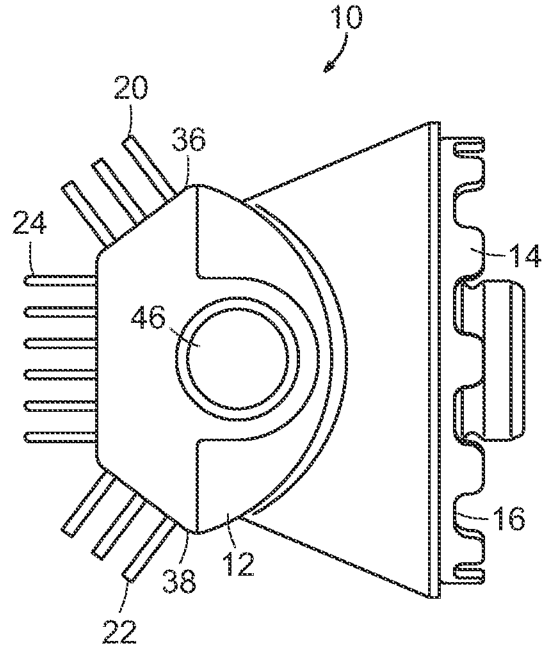
FIG. 4A is a side view of the hair dryer attachment of FIG. 1.
Figure 4B:
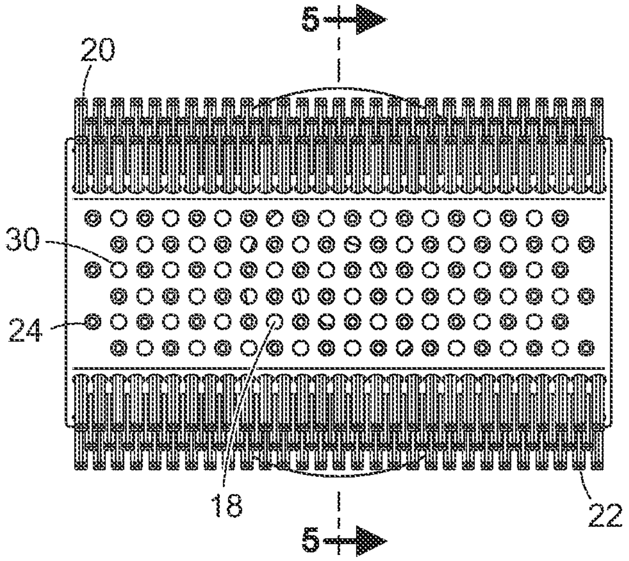
FIG. 4B is a front view of the hair dryer attachment of FIG. 1.
Figure 4C:
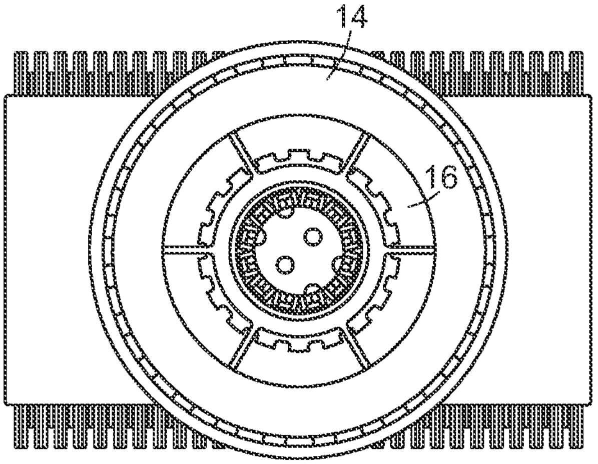
FIG. 4C is a rear view of the hair dryer attachment of FIG. 1.

Referring to FIGS. 4A, 4B and 4C, the outer frame 12 of the hair dryer attachment 10 includes front portion 26 and a rear portion 28. The front portion 26 includes three (3) facets and defines the attachment outlet 18. In the present embodiment, the attachment outlet 18 is comprised of a series of openings 30 that permit air to pass therethrough from inside the outer frame 12. A central facet 32 includes openings 30 forming at least a portion of the attachment outlet 12. Interspersed between the openings 30 are a series of prongs 24 arranged in multiple rows. In the embodiment shown, there are six (6) rows of prongs 24. The prongs 24 are generally shaft-like and are have a first stiffness. In some embodiments, the prongs 24 can be hollow shafts that also permit air to pass therethrough and also form at least a portion of the attachment outlet 18.

Adjacent the central facet 32 is a first angled facet 36. The first angled facet 36 includes a first set of bristles 20 that defines a second stiffness, wherein the bristles 20 preferably are less stiff than the prongs 24. The bristles 20 are preferably mounted directly in the surface outer frame 12 material, as shown for example in FIG. 5. Although the bristles 20 can have any suitable arrangement, they are preferably arranged in rows. In the embodiment shown, there are three (3) rows of bristles 20 provided. The first angled facet 36 is angled approximately 45-degrees relative to the central facet 32. The first angled facet 36 can also, optionally, include first facet openings that operate as a portion of the attachment outlet 18.

Adjacent the central facet 32 opposite the first angled facet 36 is a second angled facet 38. The second angled facet 36 includes a second set of bristles 22 that defines a third stiffness, wherein the third stiffness is preferably less stiff than the first stiffness prongs 24. The third stiffness can be equal to, slightly greater than or slightly less than the second stiffness associated with the bristles 20 of the first angled facet 36. Although the second set of bristles 22 can have any suitable arrangement, they are preferably arranged in rows. In the embodiment shown, there are three (3) rows in the second set of bristles 22. The second angled facet 38 is preferably disposed at an approximately 45-degree angle relative to the central facet 32. The second angled facet 38 can also, optionally, include second facet openings that operate as a portion of the attachment outlet 18.

Figure 5:
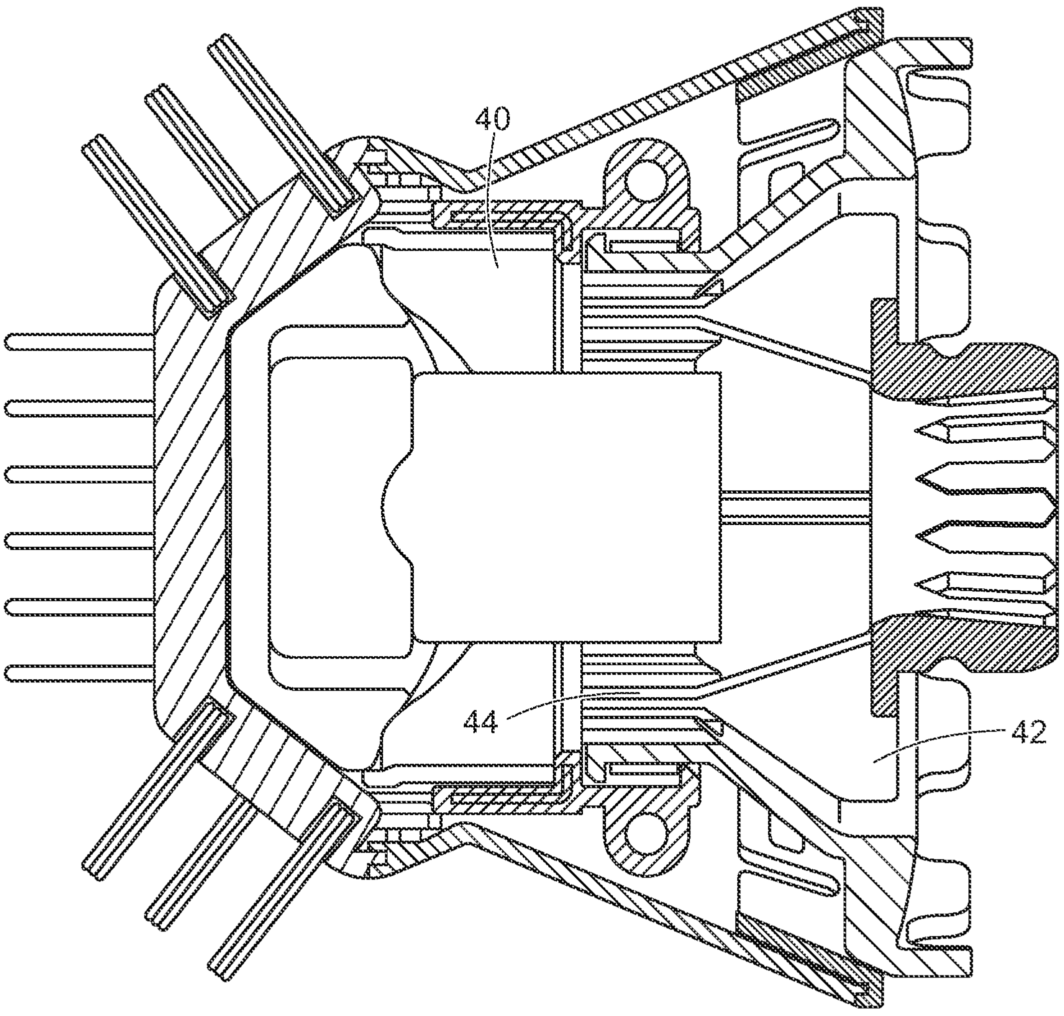
FIG. 5 is a cross-sectional view along line 5-5 of the hair dryer attachment of FIG. 4B.

Referring now to FIGS. 4C and 5, the hair dryer attachment 10 includes a base 14. The base is rotatably coupled to the outer frame 12 and, together, the outer frame 12 and the base 14 form an interior volume 40. The base 14 defines an attachment inlet 16 through which air is received from the hair dryer 200 during normal operation. The attachment inlet 16 is in fluid communication with the internal volume 40. The internal volume 40 defines a flow path through which air may pass from the attachment inlet 16 to the attachment outlets 18. The base 14 is selectively rotatable relative to the outer frame 12. The base 14 includes a set of base engagement features 42 that are complementary to a set of frame engagement features 44. The frame engagement features 44 define numerous positions into which the outer frame 12 can be positioned relative to the base 14. As shown in FIG. 4A, a release button 46 is provided that operates to disengage the base engagement features 42 from the frame engagement features 44 and permit the outer frame 12 to be rotated and positioned in the desired orientation relative to the base 14. When the release button 46 is released, the base engagement features 42 from the frame engagement features 44 re-engage and halt further rotation of the outer frame 12 relative to the base 14.

In operation, the user removably attaches the hair dryer attachment 10 to the hair dryer 200 such that the attachment inlet 16 is in fluid communication with the air emerging from the hair dryer 200. The user turns on the hair dryer 200 so that heated air is expelled from the hair dryer outlet 202 and into the hair dryer attachment 10 through the attachment inlet 16.

Airflow passes through the internal volume 40 of the outer frame and exits through the attachment outlet 18 in the form of openings located on the central facet 32, first angled facet 36, and/or second angled facet 38. The user brings the hair dryer 200 and hair dryer attachment 10 in contact with wet hair that is intended to be dried. The user moves the prongs 24, first set of bristles 20 and/or second set of bristles 22 through his or her hair as the hot, dry air dries the hair. The user is then able to brush, smooth and even style his or her during the drying process.

The user may optionally depress the release button 46 to disengage the base engagement features 42 from the frame engagement feature 44 and rotate the outer frame 12 relative to the base 14. Once the user has rotated the outer frame 12 to a desired orientation, he or she can release the release button 46. The outer frame 12 will then remain locked in position relative to the base 14 as the base engagement features 42 re-engage with the frame engagement features 44.

Referring now to FIGS. 2, 6A, 6B and 6C, a second embodiment of the present invention is disclosed. The hair dryer attachment 100 of the second embodiment includes an outer housing, 112, a base 114, an attachment inlet 116, an attachment outlet 118, and a series of prongs 120.

Figure 6A:
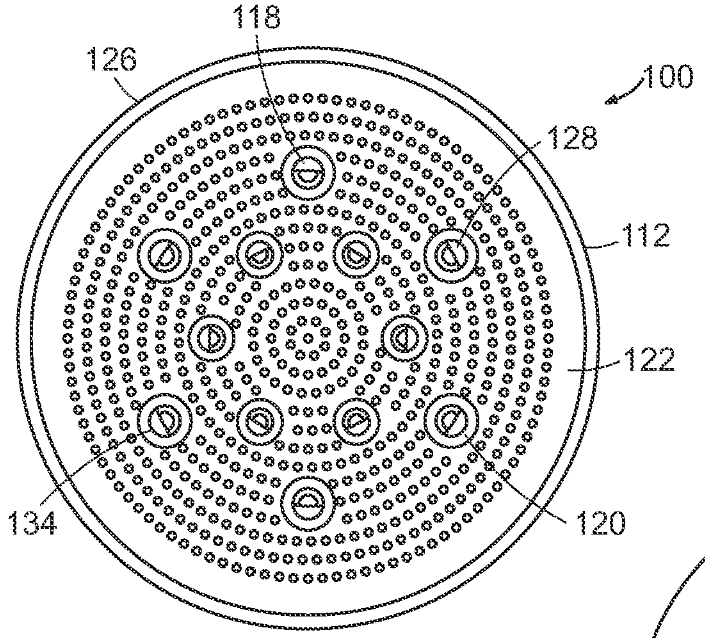
FIG. 6A is a front view of the hair dryer attachment of FIG. 2.

Referring to FIG. 6A, the outer housing 112 can be comprised of a single, unitary piece, or multiple components that are affixed. The outer housing 112 includes a cup-shaped face that includes a concave surface 122 and defines an outer lip 126. The outer lip 126 defines a plane (P) across the opening of the concave surface 122. The concave surface 122 includes a plurality of holes 124 that, optionally, form a portion of the attachment outlet 118. The concave surface 122 further includes a series of prong holes 128, each operable to receive a prong 120 therethrough.

Figure 7:
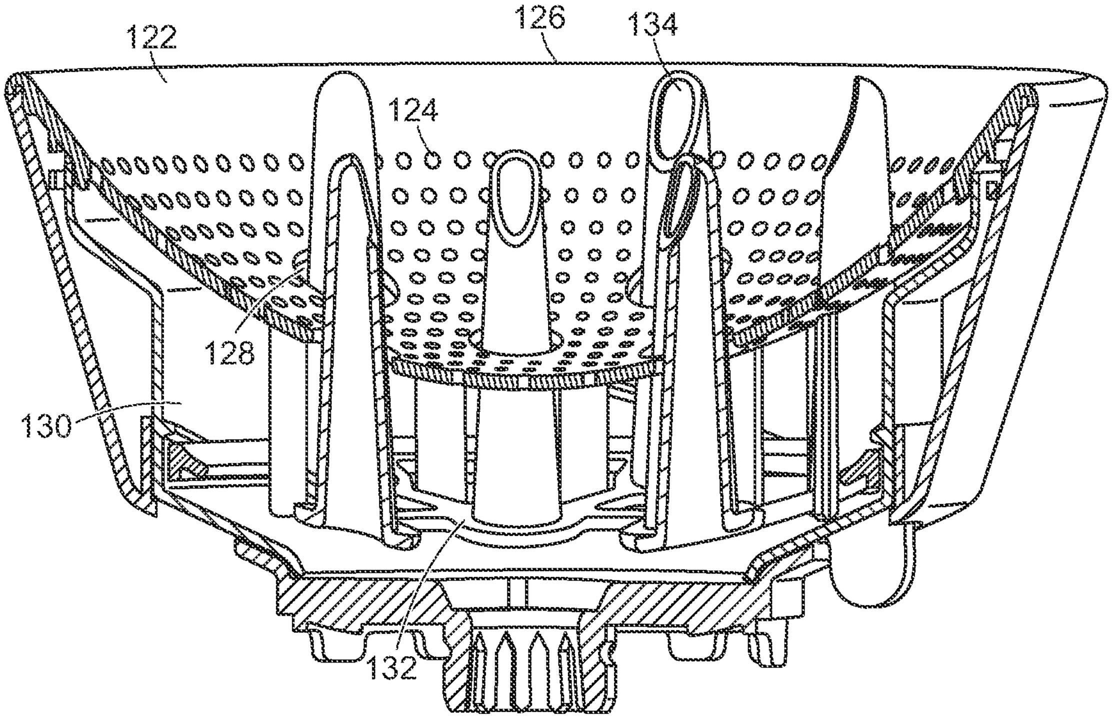
FIG. 7 is a cross-sectional view along line 7-7 of the hair dryer attachment of FIG. 6C.

Referring now to FIG. 7, the outer housing 112 is coupled to the base 114. The base 114 includes an attachment inlet 116 through which air emerging from the hair dryer 200 enters the attachment 100. The base 114 and the outer housing 112 combine to form an internal volume 130 therein.

A series of prongs 120 are interconnected on a platform 132 that is movable between a retracted position and an extended position. FIG. 7 depicts the platform 132 and prongs 120 in the retracted position. The prongs 120 are generally shaft-like and the prongs 120 preferably include a prong air passageway 134 therethrough. However, it should be noted that individual prongs 120 may be solid and not include a prong air passageway 134. In the embodiment shown, twelve (12) prongs 120 are shown. The prongs 120 include a distal end 136 that extend through the prong holes 128 in the concave surface 122. In the retracted position, the distal end 136 of the prongs 120 are located in close proximity to the concave surface 122. In the extended position, the distal end 136 of the prongs 120 are spaced away from the concave surface 122. In some embodiments, the distal end 136 of the prongs 120 extend past the plane (P) defined by the outer lip 126.

Figure 6B:
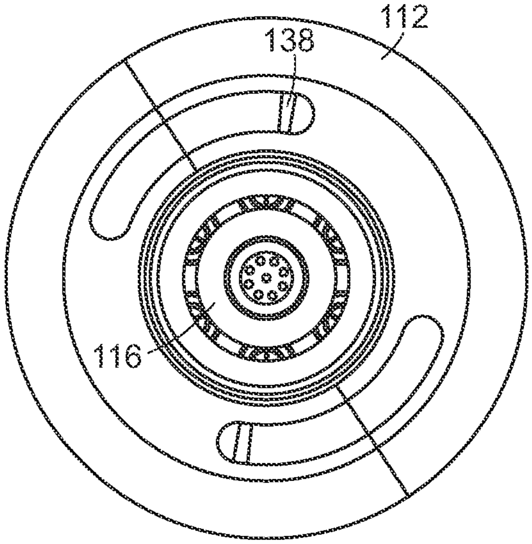
FIG. 6B is a rear view of the hair dryer attachment of FIG. 2.
Figure 6C:
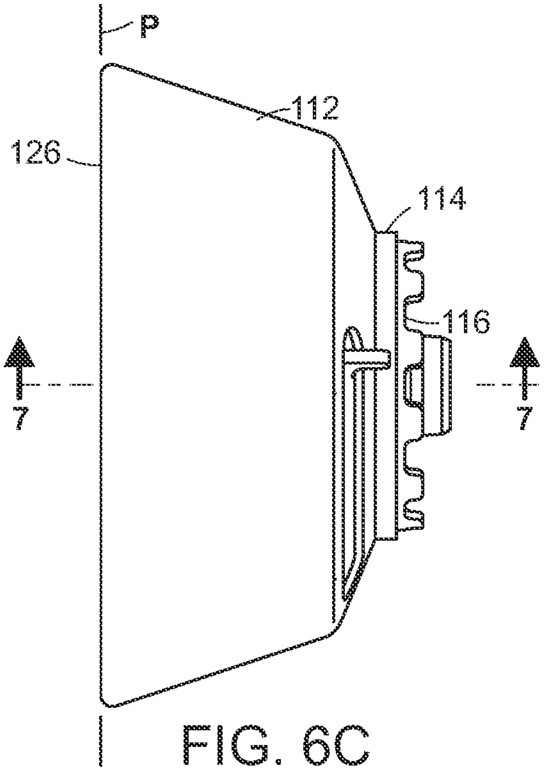
FIG. 6C is a side view of the hair dryer attachment of FIG. 2.

Referring to FIGS. 6B and 7, the attachment 100 includes a lever 138 that is operable by the user to move the platform 132 and the prongs 120 between the retracted position and the extended position.

In operation, the user removably attaches the hair dryer attachment 100 to the hair dryer 200 such that the attachment inlet 116 is in fluid communication with the air emerging from the hair dryer 200. The user turns on the hair dryer 200 so that heated air is expelled from the hair dryer outlet 202 and into the hair dryer attachment 100 through the attachment inlet 116.

Airflow enters the internal volume 130 of the attachment 100. At least some of the airflow enters into one or more of the prong air passageways 134 and passes through the prong 120 before exiting the attachment 100 at the distal end of the prong 120. In some embodiments, airflow also passes through openings 124 in the concave surface 122 of the outer housing 112. The user brings the hair dryer 200 and attachment 100 in close proximity to his or her wet hair such that, preferably, the wet hair enters into the volume formed by the concave surface 122. As the user moves the attachment 100 through his or her hair, the prongs 120 generally act to comb the wet hair as well as deliver hot air directly into the hair. In addition, hot air expelled via the openings 124 in the concave surface 122 also deliver hot air to the wet hair.

The user optionally moves the lever to a retracted position and the platform 132 and prongs 120 retreat into the internal volume 130 such that the platform 132 is in close proximity to the base 114.

The user optionally moves the lever to a extended position and the platform 132 and prongs 120 move in the internal volume 130 towards the concave surface such that the platform 132 is spaced further from the base 114 than when in the retracted position. In some embodiments, the platform is adjacent the underside 138 of the concave surface 122.

Optionally, the user can select a position between the extended position and the retracted position.

One of skill in the art would know that additional embodiments, or variations to the above description can be made without departing from the spirit or scope of the invention.

We claim:

1. An attachment for a hair dryer, comprising:

an outer frame having:

a first facet that includes a first set of prongs and at least one opening operable to permit airflow to exit the attachment;

a second facet that includes a first set of bristles; and at least one frame engagement feature;

a base rotatably coupled to the outer frame, the base including an attachment inlet and at least one base engagement feature;

wherein the outer frame and base form an internal volume through which airflow can pass between the attachment inlet to the at least one opening of the first facet;

wherein at times the at least one base engagement feature is engaged with the at least one frame engagement feature, the base is prevented from rotating relative to the outer frame; and wherein at times the at least one base engagement feature is not engaged with the at least one frame engagement feature, the base is rotatable to a user selected position relative to the outer frame.

2. The attachment for a hair dryer of claim 1 further including a third facet that includes a second set of bristles.

3. The attachment for a hair dryer of claim 2 wherein the first facet is positioned between the second facet and the third facet.

4. The attachment for a hair dryer of claim 2 wherein the third facet is angled relative to the first facet.

5. The attachment for a hair dryer of claim 1 wherein the second facet is angled relative to the first facet.

6. The attachment for a hair dryer of claim 1 wherein the prongs define a first stiffness and the first set of bristles define a second stiffness, the first stiffness being greater than the second stiffness.

7. The attachment for a hair dryer of claim 1 further including a release button for disengaging the at least one frame engagement feature from the at least one base engagement feature.

8. The attachment for a hair dryer of claim 1 wherein the second facet includes at least one opening operable to permit airflow to exit the attachment.

9. An attachment for a hair dryer, comprising:

an outer housing having a concave surface that includes an opening;

a base coupled to the outer housing such that the base and the outer housing define an internal volume therebetween, the base defining an attachment inlet operable to receive airflow from a hair dryer;

a first prong coupled to a movable platform, the prong extending from the platform to a distal end and including a prong air passageway operable to permit air to pass through the prong;

wherein the platform is positioned in the internal volume and at least a portion of the prong extends through the opening in the concave surface;

wherein the movable platform is movable between a first position and a second position; and wherein a greater portion of the prong extends through the opening at times the platform is in the second position than at times the platform is in the first position.

10. The attachment of claim 9 further comprising a plurality of prongs coupled to the movable platform.

11. The attachment of claim 10 wherein each of the plurality of prongs extends through an opening in the concave surface.

12. The attachment of claim 11 wherein the outer housing defines a lip surrounding the concave surface, the lip defining a plane;

wherein the distal end of at least one prong is positioned on an opposite side of the plane than the platform at times the platform is in the second position.

13. The attachment of claim 9 wherein the concave surface includes at least one opening operable to operable to permit air to exit the attachment from the internal volume.

* * * * *